United States Patent
Machida et al.

(10) Patent No.: US 7,870,615 B2
(45) Date of Patent: Jan. 11, 2011

(54) INFORMATION TERMINAL WITH FUNCTION OF PLAYING BACK CONTENTS

(75) Inventors: Satoshi Machida, Akishima (JP); Yoichi Nagashima, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1299 days.

(21) Appl. No.: 11/385,938

(22) Filed: Mar. 21, 2006

(65) Prior Publication Data

US 2007/0056048 A1 Mar. 8, 2007

(30) Foreign Application Priority Data

Sep. 6, 2005 (JP) ............................. 2005-258136

(51) Int. Cl.
*H04N 7/16* (2006.01)
*G06F 17/30* (2006.01)
*G06K 9/00* (2006.01)
*H04L 9/32* (2006.01)
*H03M 1/68* (2006.01)

(52) U.S. Cl. .......................................... 726/29; 726/27

(58) Field of Classification Search ................... 726/27, 726/29

See application file for complete search history.

(56) References Cited

U.S. PATENT DOCUMENTS

| 7,146,559 | B2 | 12/2006 | Sakuma |
| 2003/0105890 | A1 | 6/2003 | Sakuma |
| 2003/0142960 | A1* | 7/2003 | Yokota et al. ................. 386/94 |
| 2004/0230994 | A1* | 11/2004 | Urdang et al. ................. 725/88 |
| 2006/0035677 | A1* | 2/2006 | Aerrabotu et al. ........... 455/565 |

FOREIGN PATENT DOCUMENTS

| JP | 09-074549 A | 3/1997 |
| JP | 2002-91846 A | 3/2002 |
| JP | 2002-175090 A | 6/2002 |
| JP | 2003-169377 A | 6/2003 |
| JP | 2005-167455 A | 6/2005 |

OTHER PUBLICATIONS

Japanese Office Action (and English translation thereof) dated Apr. 8, 2008, issued in a counterpart Japanese Application.

* cited by examiner

*Primary Examiner*—Kambiz Zand
*Assistant Examiner*—Aubrey H Wyszynski
(74) *Attorney, Agent, or Firm*—Holtz, Holtz, Goodman & Chick, PC

(57) ABSTRACT

In one aspect of this invention, upon playing back contents, a content to be played back is selected from a plurality of contents stored in a storage unit, and it is checked for this selected content if a first playback mode that requires a prior playback confirmation operation or a second playback mode that does not require any prior playback confirmation operation is suitable as the playback mode of the content of interest. If it is determined that the first playback mode is suitable as the playback mode of the selected content, the content is skipped without being played back. On the other hand, if it is determined that the second playback mode is suitable as the playback mode of the selected content, that content is played back.

17 Claims, 9 Drawing Sheets

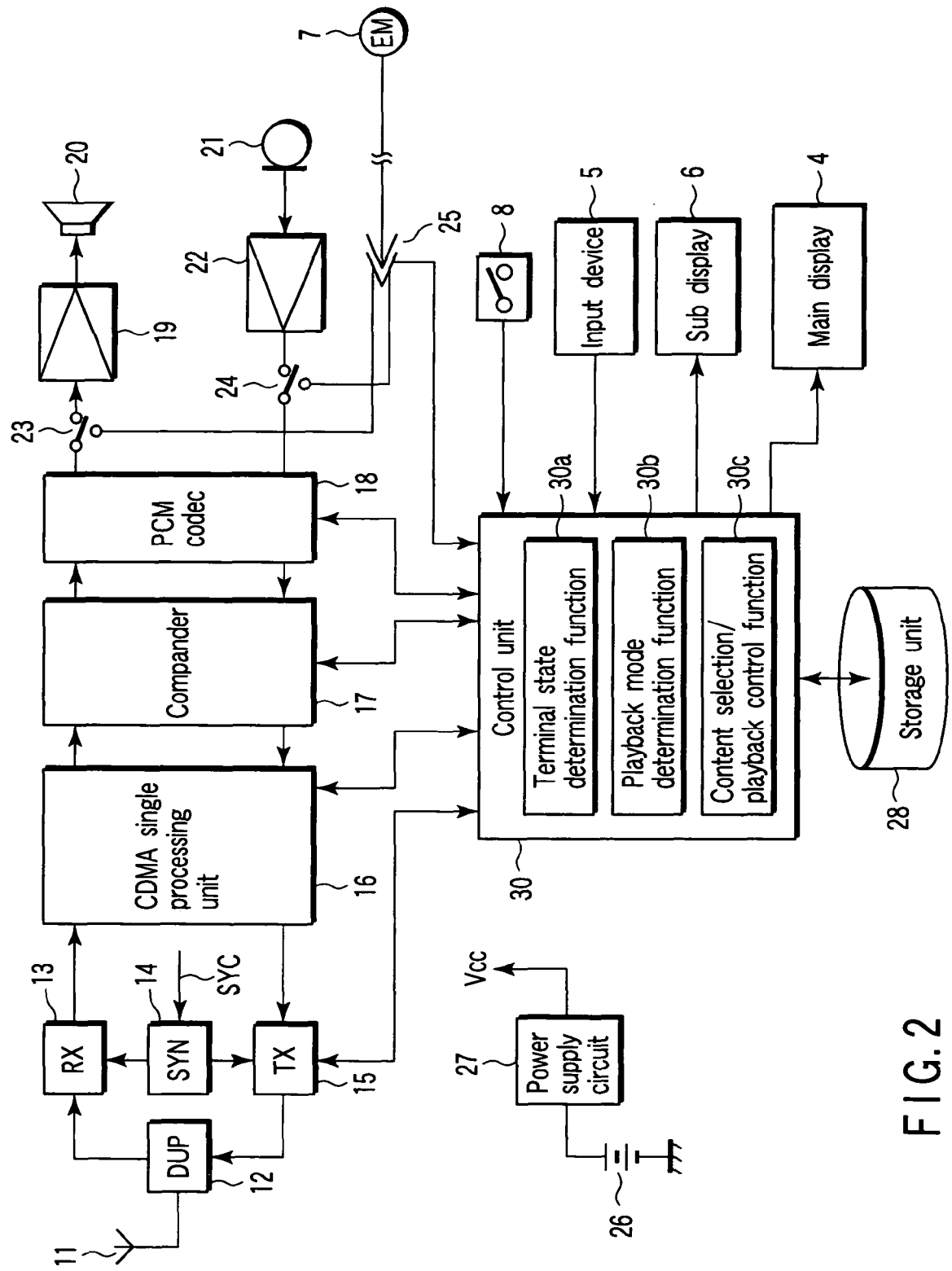
F I G. 2

| Right | Right type | Other conditions | Foreground playback | Background playback |
|---|---|---|---|---|
| Yes | datetime | - | Play back | Play back |
| | interval | First playback | Display consumption start selection popup<br>Upon selection of Yes: play back<br>Upon selection of No: skip (to next music piece) | Play back |
| | | Second or subsequent playback | Play back | Play back |
| | count | Two or more times left | Play back | Play back |
| | | One time left | Display one-time left playback selection popup<br>Upon selection of Yes: play back<br>Upon selection of No: skip (to next music piece)<br><br>Display right purchase selection popup after playback<br>Upon selection of Yes: purchase right, and return to list<br>Upon selection of No: skip (to next music piece) | Skip (to next music piece) |
| | Unconstrained Rights | - | Play back | Play back |
| No | datetime | - | Display right purchase selection popup<br>Upon selection of Yes: purchase right, and return to list<br>Upon selection of No: skip (to next music piece) | Skip (to next music piece) |
| | interval | - | Display right purchase selection popup<br>Upon selection of Yes: purchase right, and return to list<br>Upon selection of No: skip (to next music piece) | Skip (to next music piece) |
| | count | - | Display right purchase selection popup<br>Upon selection of Yes: purchase right, and return to list<br>Upon selection of No: skip (to next music piece) | Skip (to next music piece) |

FIG. 5

Playback mode determination table

| Playback constraint | Copyright constraint type | Condition | Damage of content file | Playback mode |
|---|---|---|---|---|
| Yes | Datetime | - | No | Second playback mode |
| | | | Yes | First playback mode |
| | Interval | - | No | Second playback mode |
| | | | Yes | First playback mode |
| | Count | Two or more times left | No | Second playback mode |
| | | | Yes | First playback mode |
| | | One time left | Yes/No | First playback mode |
| | Unconstrained Right | - | No | Second playback mode |
| | | | Yes | First playback mode |
| No | Datetime | - | Yes/No | First playback mode |
| | Interval | - | Yes/No | First playback mode |
| | Count | - | Yes/No | First playback mode |

FIG. 8

# INFORMATION TERMINAL WITH FUNCTION OF PLAYING BACK CONTENTS

CROSS-REFERENCE TO RELATED APPLICATIONS

This application is based upon and claims the benefit of priority from prior Japanese Patent Application No. 2005-258136, filed Sep. 6, 2005, the entire contents of which are incorporated herein by reference.

BACKGROUND OF THE INVENTION

1. Field of the Invention

The present invention relates to an information terminal such as a mobile phone, PDA (Personal Digital Assistant), personal computer, or the like and, more particularly, to an information terminal with a function of playing back contents.

2. Description of the Related Art

In recent years, many of information terminals such as a mobile phone, PDA, and the like have a content playback function in addition to a mail communication function, Internet access function, voice communication function, and the like. The content playback function downloads a desired content from a content delivery server using the communication function of the information terminal itself or loads a content from an external storage medium such as a memory card or the like or another information terminal such as a personal computer or the like, and stores the content in an internal memory or an attached external memory. The stored content is played back in response to a user's playback operation. As the types of contents, for example, music contents, video contents, and multimedia contents including audio, video, and text data are available.

Some contents are given copyright information that specifies the expiration dates, playback counts, and the like. When a content of such type is to be played back, a confirmation message indicating that the content is copyrighted is displayed on a display prior to playback. In this state, when the user performs a confirmation operation for the copyright, it is checked if the playback conditions are met. If the playback conditions are met, the content playback starts. If the content file is broken or if the file format is not compatible to the terminal and the content cannot be played back, a warning message that advices accordingly is displayed prior to playback. This technique is described in, e.g., Jpn. Pat. Appln. KOKAI Publication No. 2003-169377.

However, every time the confirmation message or warning message is displayed upon playing back the content, the user must perform the confirmation operation using an input key of the terminal, and then must perform an operation for selecting another content that can be played back. For this reason, such operations are troublesome, and impose a heavy load on the user.

Especially, when a music content is to be played back by a portable terminal, the terminal is put in a bag or pocket, and an earphone is used. For this reason, in order to perform the confirmation operation, the user must take out the terminal from the bag or pocket or must use a remote controller attached to the earphone. The operation at that time is especially troublesome for the user. Even when the terminal is not put in the bag or pocket, if the terminal is in a state wherein acceptance of a key input operation is constrained like a state wherein the housing of a flip type terminal is closed, the operability for the confirmation operation unavoidably drops.

BRIEF SUMMARY OF THE INVENTION

The present invention has been made in consideration of the above situation, and has as its object to provide an information terminal which can play back a content without requiring any user's operation and in deference to the copyright, thereby allowing a reduction of the operation load on the user and smooth content playback while protecting the copyright.

In order to achieve the above object, according to one aspect of the present invention, upon playing back contents, a content to be played back is selected from a plurality of contents stored in a storage unit, and it is checked for the selected content if a first playback mode that requires a prior playback confirmation operation or a second playback mode that does not require any prior playback confirmation operation is suitable as the playback mode of the content of interest. If it is determined that the first playback mode is suitable as the playback mode of the selected content, the content is skipped without being played back. On the other hand, if it is determined that the second playback mode is suitable as the playback mode of the selected content, that content is played back.

In order to achieve the above object, according to another aspect of the present invention, upon playing back contents, it is checked if an information terminal is in an input constrained state in which the user's input operation is constrained. If it is determined that the information terminal is in the input constrained state, contents which do not require any prior playback confirmation operation are selected from those to be selected, and the selected contents are played back.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 1A and 1B show an outer appearance of a mobile phone according to the first embodiment of the present invention, in which FIG. 1A is a perspective view showing a closed state of a housing, and FIG. 1B is a perspective view showing an open state of the housing;

FIG. 2 is a block diagram showing the functional arrangement of the mobile phone shown in FIGS. 1A and 1B;

FIG. 5 shows a list of playback processing contents according to content types;

FIG. 8 shows an example of a playback mode determination table used in the content selection/playback control shown in FIG. 3;

DETAILED DESCRIPTION OF THE INVENTION

First Embodiment

Figure 1A:
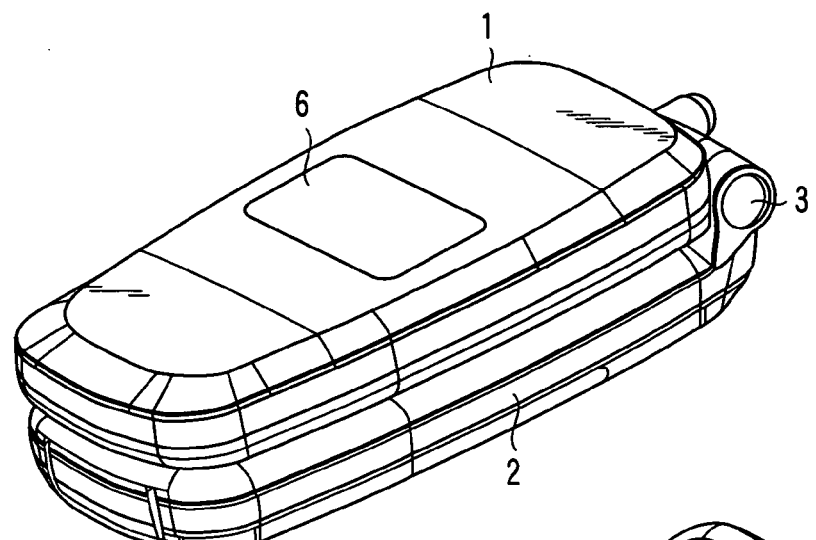
Figure 1B:
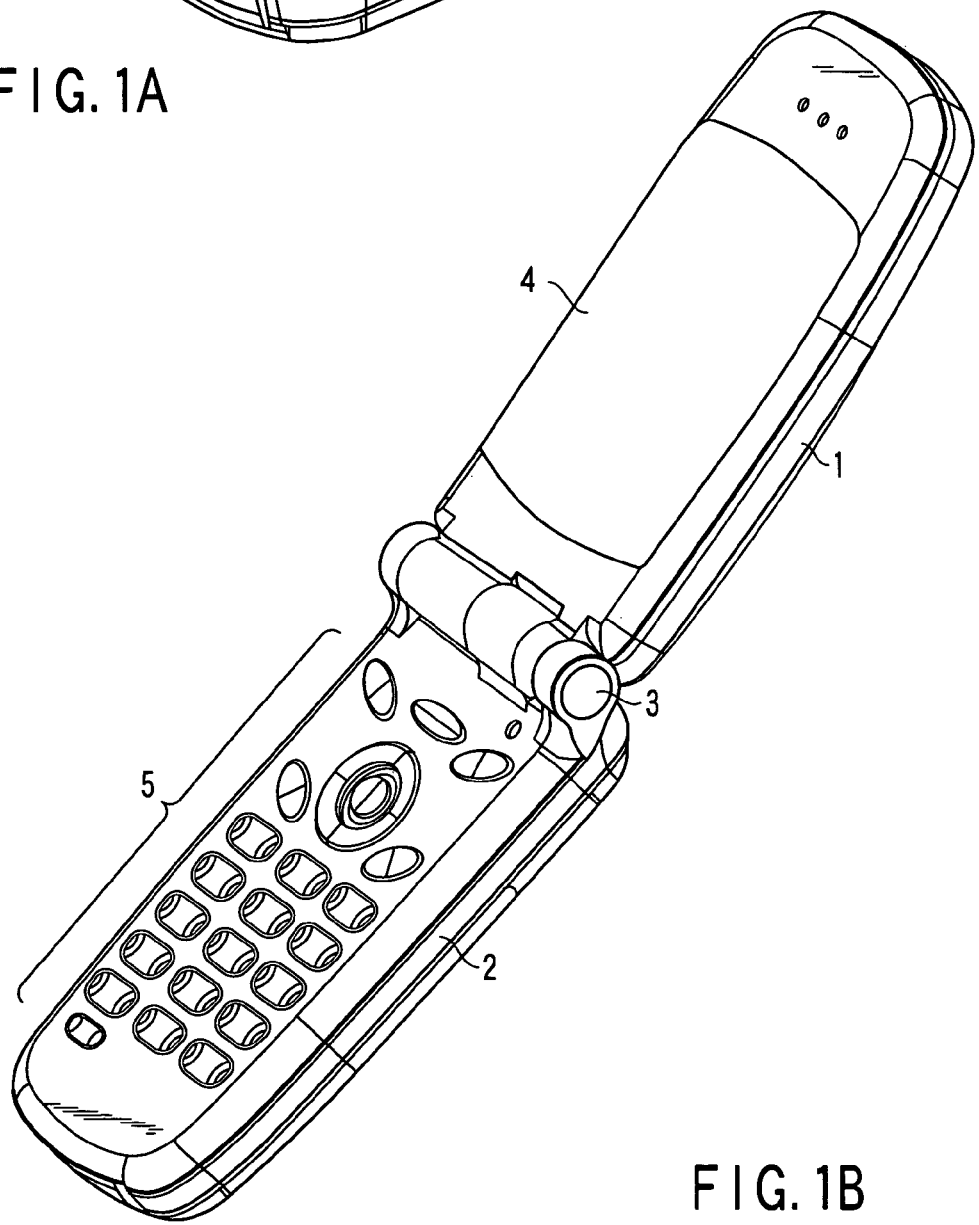

FIGS. 1A and 1B are perspective views showing the outer appearance of a mobile phone as an information terminal according to the first embodiment of the present invention. This mobile phone is a so-called flip type (clam-shell type) mobile phone formed by pivotally joining an upper housing 1 and lower housing 2 via a hinge 3. FIG. 1A shows the closed state of the housings 1 and 2, and FIG. 1B shows the open state of the housings 1 and 2.

A main display 4 is arranged on the front surface of the upper housing 1, and a sub display 6 is arranged on its rear surface. Both of these displays 4 and 6 comprise an LCD (Liquid Crystal Display). An input device 5 is arranged on the front and side surfaces of the lower housing 2. The input device 5 includes dial keys, a plurality of function keys, tone volume control keys, and the like. A main printed circuit board is housed in the lower housing 2. The main printed circuit board and the displays 4 and 6 are connected via a signal cable. The signal cable is obtained by forming a plurality of signal line patterns on a flexible board and attaching connectors to two ends, and runs via a cavity in the hinge 3.

FIG. 2 is a block diagram showing the circuit arrangement of the mobile phone. Referring to FIG. 2, a radio signal sent from a base station (not shown) is received by an antenna 11, and is input to a reception circuit (RX) 13 via a duplexer 12. The reception circuit 13 mixes the received radio signal with a local oscillation signal output from a frequency synthesizer (SYN) 14 to down-convert it to an intermediate frequency signal. The down-converted intermediate frequency signal is orthogonally demodulated to output a reception baseband signal. The frequency of the local oscillation signal generated by frequency synthesizer 14 is designated by a control signal SYC output from a control unit 30.

The reception baseband signal is input to a CDMA (Code Division Multiple Access) signal processing unit 16. The CDMA signal processing unit 16 comprises a RAKE receiver. In the RAKE receiver, multipath signals included in the reception baseband signal undergo inverse spreading processing by spreading codes. The multipath signals that have undergone the inverse spreading processing are arbitrated and are then combined. In this way, reception packet data in a predetermined transmission format is obtained. This reception packet data is input to a compression/decompression processing unit (to be referred to as a compander hereinafter) 17.

The compander 17 demultiplexes the reception packet data output from the CDMA signal processing unit 16 into data for respective media using a demultiplexer. The compander 17 applies decoding processing to the demultiplexed data for respective media. For example, if the reception packet data includes audio data, the compander 17 decodes this audio data by a speech codec. On the other hand, if the reception packet data includes video data, the compander 17 decodes this video data by a video codec.

A digital audio signal obtained by the decoding processing is supplied to a PCM code processing unit (to be referred to as a PCM codec hereinafter) 18. The PCM codec 18 PCM-decodes the digital audio signal output from the compander 17 and outputs an analog audio signal. This analog audio signal is amplified by a receiver amplifier 19, and is output as speech via a loudspeaker 20. The PCM codec 18, receiver amplifier 19, and loudspeaker 20 are also used to play back music contents stored in a storage unit 28 and to output them as a sound. This music content playback is done under the control of the control unit 30 (to be described later).

A digital video signal decoded by the video codec of the compander 17 is input to the control unit 30. The control unit 30 displays the digital video signal output from the compander 17 on the main display 4 via a video RAM. The control unit 30 also has a control function of displaying video data captured by a camera (not shown) and video contents stored in the storage unit 28 on the main display 4 in addition to the received video data.

When the reception packet data is e-mail data, the compander 17 outputs this e-mail data to the control unit 30. The control unit 30 stores the e-mail data in a received mail storage area in the storage unit 28. The control unit 30 reads out the e-mail data from the received mail storage area, and displays it on the main display 4 in response to a user's display operation at the input device 5. Note that the sub display 6 displays information indicating the operation mode of the mobile phone, incoming call notifying information, information indicating the remaining level or charging state of a battery 26, a clock indicating the current time, and the like.

On the other hand, a voice signal of a speaker input to a microphone 21 is amplified to an appropriate level by a transmitter amplifier 22, and then undergoes PCM coding processing by the PCM codec 18 to be converted into a digital audio signal, which is input to the compander 17. A video signal output from the camera (not shown) is converted into a digital video signal by the control unit 30, and the digital video signal is input to the compander 17. Note that e-mail data created by the control unit 30 is also input from the control unit 30 to the compander 17.

The compander 17 detects the energy level of an input speech from the digital audio signal output from the PCM codec 18, and determines a transmission data rate based on this detection result. The compander 17 encodes the digital audio signal into a signal of a format according to the transmission data rate, thus generating audio data. Also, the compander 17 encodes the digital video signal output from the control unit 30 to generate video data. The compander 17 multiplexes these audio and video data according to a predetermined transmission format using a multiplexer to generate transmission packet data, and outputs the transmission packet data to the CDMA signal processing unit 16. Furthermore, when e-mail data is output from the control unit 30, the compander 17 converts this e-mail data into packet data.

The CDMA signal processing unit 16 applies spread spectrum processing to the transmission packet data output from the compander 17 using a spreading code assigned to a transmission channel. Then, the unit 16 outputs the output signal to a transmission circuit (TX) 15. The transmission circuit 15 modulates the spread spectrum signal using a digital modulation system such as QPSK (Quadrature Phase Shift Keying) or the like. The transmission circuit 15 combines a transmission signal generated by this modulation with a local oscillation signal generated from the frequency synthesizer 14 to up-convert it to a radio signal. Then, the transmission circuit 15 RF-amplifies the radio signal to a transmission power level designated by the control unit 30. The amplified radio signal is supplied to the antenna 11 via the duplexer 12, and is transmitted to the base station via this antenna 11.

This mobile phone comprises an earphone connector 25. An earphone microphone 7 is detachably attached to this earphone connector 25. The attachment/detachment of the earphone microphone 7 to this earphone connector 25 is detected by a detector provided to the earphone connector 25, and a signal indicating the detection result is sent to the control unit 30. A remote controller is attached to the earphone microphone 7, and an operation signal of this remote controller is input to the control unit 30 via the earphone connector 25. A pair of switches 23 and 24 are inserted between the PCM codec 18, and the receiver amplifier 19 and transmitter amplifier 22. These switches 23 and 24 alternatively connect the receiver amplifier 19 and transmitter amplifier 22, and the earphone connector 25 to the PCM codec 18, and their switching states are controlled by the control unit 30.

Note that a power supply circuit 27 generates a predetermined operation power supply voltage Vcc based on a power supply output of the battery 26, and supplies it to respective circuits. The battery 26 is charged by a charging circuit (not shown). Reference numeral 8 in FIG. 2 denotes a detector for detecting the open/close state of the housings 1 and 2, and its detection signal is input to the control unit 30.

The storage unit 28 uses an EEPROM, hard disk, or the like as a storage medium, and comprises a content storage area in addition to areas for storing a phonebook, transmission/reception data of mail messages, transmission/reception histories, and the like. The content storage area stores contents downloaded from a Web site, those transferred from another terminal such as a personal computer or the like via a signal cable, and those loaded from a memory card (not shown). The contents include music contents, video contents, and multimedia contents including video, music, and text data.

Figure 9:
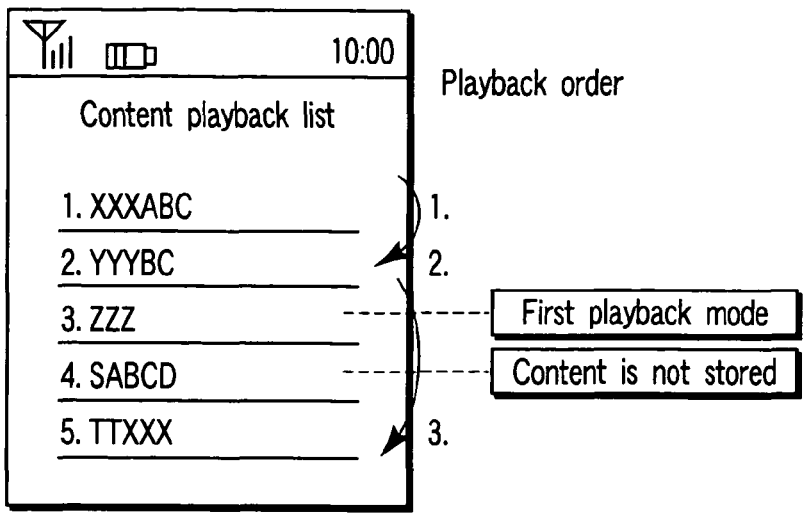
FIG. 9 shows an example of a content playback list.

Furthermore, the storage unit 28 stores a plurality of content playback lists each of which records the order upon playing back contents, and a playback mode determination table. Each content playback list has a configuration, as shown in, e.g., FIG. 9. The playback mode determination table stores content playback modes in association with combinations of the presence/absence of playback constraints, the types and conditions of copyright constraints, and the presence/absence of damage to content files, as shown in, e.g., FIG. 8. The playback modes include a first playback mode that requires a user's prior playback confirmation operation, and a second playback mode that does not require any user's prior playback confirmation operation.

The control unit 30 comprises, e.g., a microcomputer, and has, as new control function according to this invention, a terminal state determination function 30*a*, playback mode determination function 30*b*, and content selection/playback control function 30*c*. These functions 30*a* to 30*c* are implemented when the microcomputer executes programs.

The terminal state determination function 30*a* determines whether or not the mobile phone is in a state that constrains the user's input operation. The input constrained state includes:

(1) a state wherein content playback is processed as background processing of another processing such as mail creation, Web access, or the like, and an input operation for playback confirmation cannot be directly made (including a case wherein the operation can be made only after the other processing such as mail creation, Web access, or the like is interrupted);

(2) a state wherein the housings 1 and 2 are closed, and the dial keys and function key on the front surface of the lower housing 2 cannot be operated;

(3) a state wherein input due to any erroneous contact to the input device 5 is disabled (hold state) while the mobile phone is put in a bag or pocket; and (4) a state wherein the earphone microphone 7 is connected.

The playback mode determination function 30*b* recognizes the consumption condition of copyrights (Rights) and the presence/absence of damage to the content file on the basis of attribute information appended to the content to be played back prior to content playback. The function 30*b* determines based on the playback mode determination table stored in the storage unit 28 whether the first playback mode that requires a user's prior playback confirmation operation or the second playback mode that does not require any user's prior playback confirmation operation is suitable as the playback mode of the content to be played back.

For example, if the copyright consumption condition of the content to be played back includes playback constraints (including a case without any playback constraint itself of the copyright), the copyright constraint type is "count", the remaining playback constrained count is three times, and a file does not suffer any damage, it is determined based on the playback mode determination table shown in FIG. 8 that the second playback mode is suitable as the playback mode.

The content selection/playback control function 30*c* selects and reads out contents to be played back in turn one by one on the content playback list stored in the storage unit 28, and determines based on the determination results of the playback mode determination function 30*b* and terminal state determination function 30*a* whether each readout content is to be played back intact or the content is skipped and the next content is selected. More specifically, when the first playback mode that requires a user's prior playback confirmation operation is determined as the playback mode of the selected content, and the mobile phone is in the input constrained state, the content of interest is skipped, and the next content is selected. Otherwise, the selected content is played back intact according to the determined playback mode.

When the content selection/playback control function 30*c* reads out and plays back in turn contents registered in the content playback list, if the corresponding content file is not present in the storage unit 28, the function 30*c* skips playback of that content and selects the next content.

Figure 3:
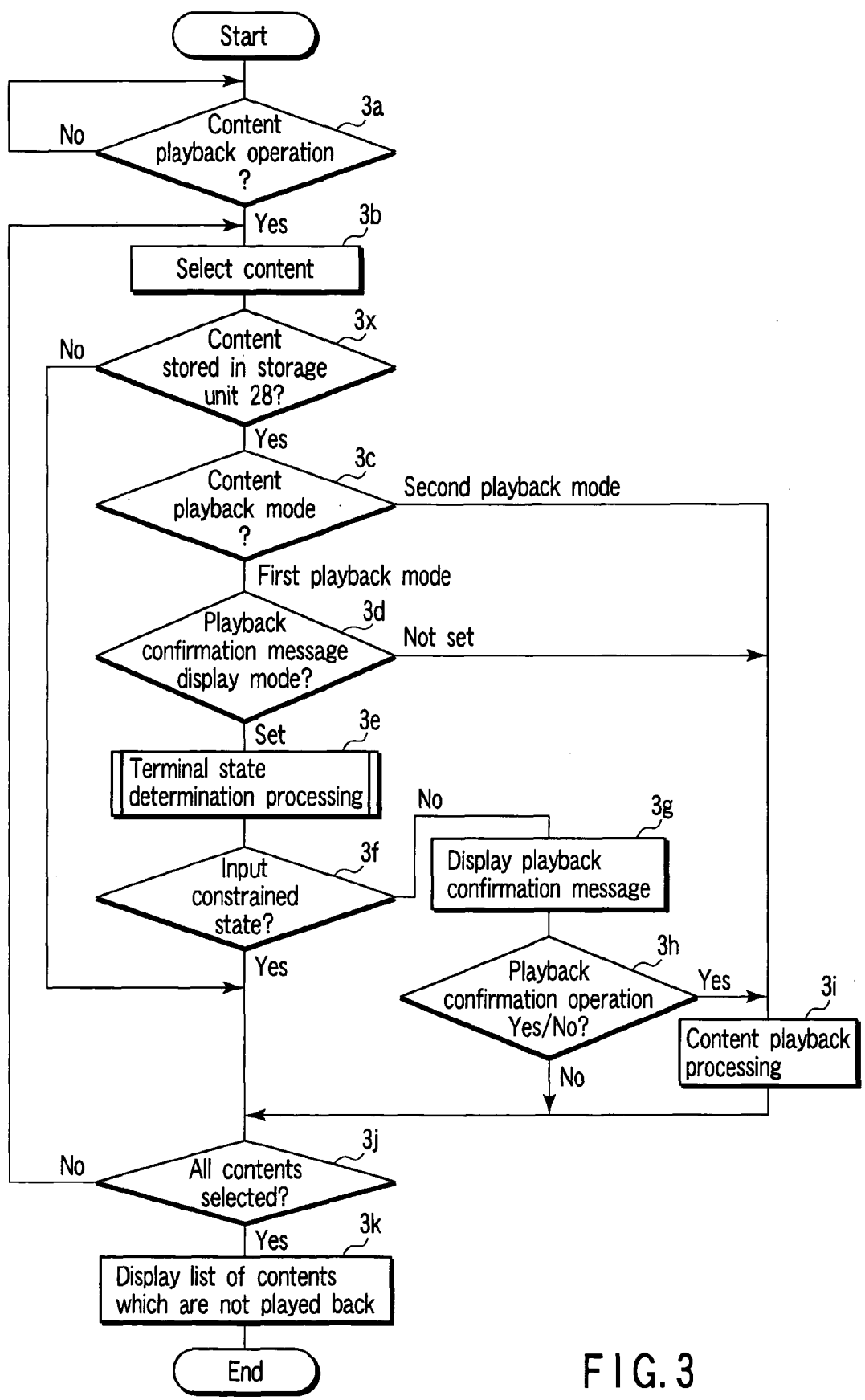
FIG. 3 is a flowchart showing the content playback control sequence and its contents of the mobile phone shown in FIG. 2.

The content selection/playback processing operation of the mobile phone with the aforementioned arrangement will be described below. FIG. 3 is a flowchart showing the control sequence and contents.

Prior to content playback, the user stores a plurality of desired contents in the storage unit 28. The contents can be stored by downloading contents from a Web site via a mobile communication network, transferring contents from another terminal such as a personal computer or the like via a signal cable, and loading contents from a memory card, as described above. The contents include music contents, video contents, and multimedia contents including video, music, and text data.

The user performs a selection operation of a content playback menu so as to play back music contents. Then, the content playback list is read out from the storage unit 28, and is displayed on the main display. The user then makes an operation for sequentially playing back the contents. Upon detection of this operation in step 3a, the control unit 30 controls the flow to advance to step 3b, and searches the content storage area of the storage unit 28 for one of music contents registered in the content playback list. The control unit 30 checks in step 3x if that music content is stored in the storage unit 28. If the music content is stored, the control unit 30 reads out that music content, and the flow then advances to step 3c. On the other hand, if that music content is not stored, the control unit 30 skips playback of the music content, and the flow jumps to step 3j.

After the flow advances to step 3c, the control unit 30 checks the copyright consumption condition and the presence/absence of damage to the content file based on attribute information of the readout music content. The control unit 30 then checks based on this determination result and the playback mode determination table stored in the storage unit 28 whether the first playback mode that requires a user's prior playback confirmation operation or the second playback mode that does not require any user's prior playback confirmation operation is suitable as the playback mode of the content to be played back. As a result of this checking, if the second playback mode is suitable, the flow directly advances to step 3i to start playback processing of that content.

This playback processing is done under the control of the control unit 30 by sending the music content to the PCM codec 18, PCM-decoding it by this PCM codec 18, amplifying the decoded music signal by the receiver amplifier 19, and then outputting the amplified music signal via the loudspeaker 20. When the earphone microphone 7 is attached to the earphone connector 25, the switches 23 and 24 are switched to the earphone connector 25 side. Hence, the music signal output from the PCM codec 18 is sent to the earphone microphone 7 via the earphone connector 25, and is output via this earphone microphone 7.

On the other hand, assume that, as a result of checking in step 3c, the playback mode of the selected music content is the first playback mode that requires a user's playback confirmation operation. In this case, the control unit 30 controls the flow to advance to step 3d, and checks if a display mode of a playback confirmation message is "set" or "not set". As a result of this checking, if the display mode is "not set" as a state in which no playback confirmation message is displayed, the flow advances to step 3i to play back the content, as described above.

Figure 4:
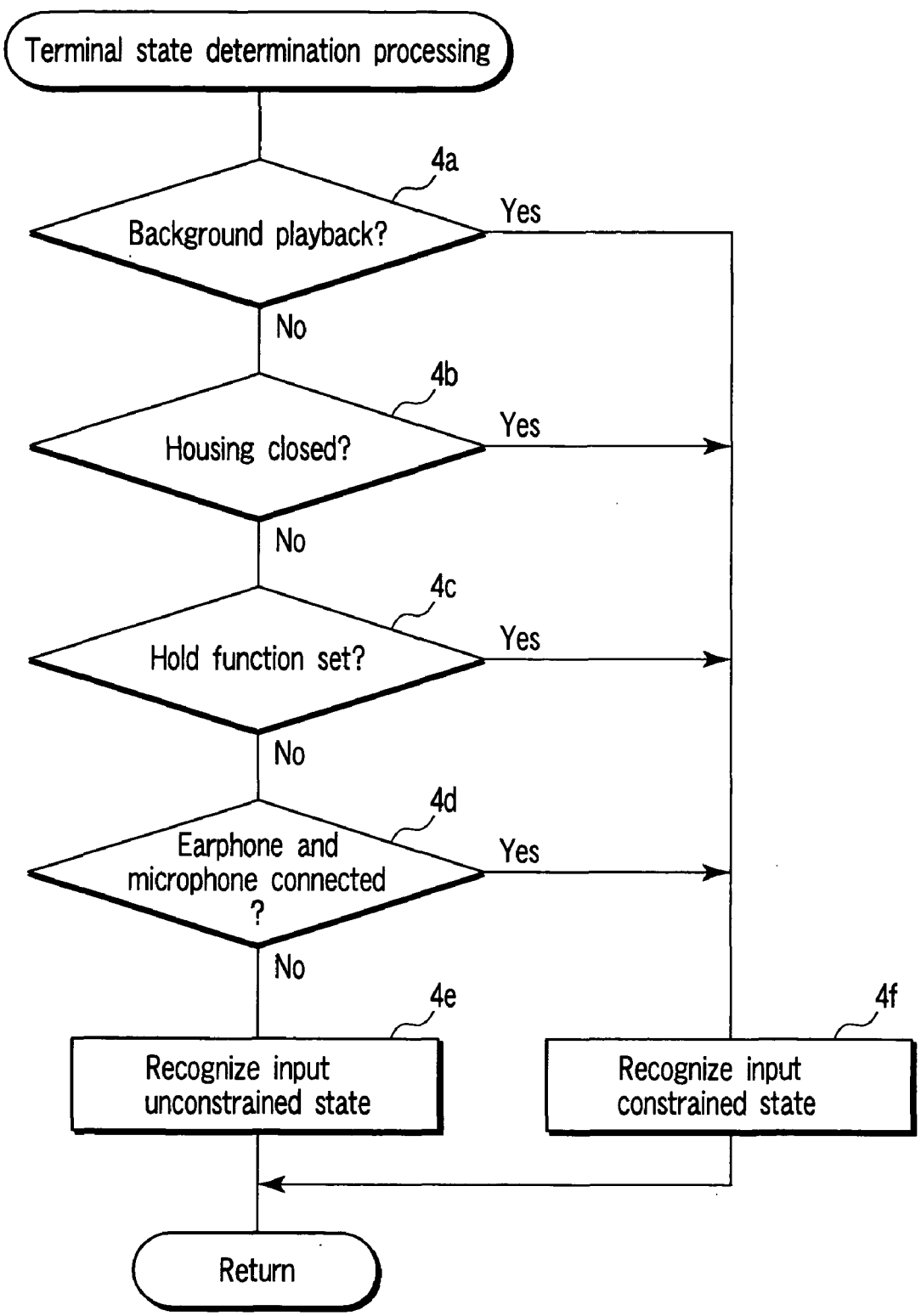
FIG. 4 is a flowchart showing the processing contents of terminal state determination processing during content playback control shown in FIG. 3.

By contrast, if the display mode of the playback confirmation message is "set", the control unit 30 controls the flow to advance to step 3e, and executes the processing for determining the state of the mobile phone as follows. FIG. 4 is a flowchart showing the processing contents of this processing.

That is, the control unit 30 checks in step 4a if content playback is processed as background processing of another processing such as mail creation, Web access, or the like. As a result of checking, if background playback is determined, the flow advances to step 4f to recognize that the mobile phone is now in a so-called input constrained state in which the input operation associated with content playback cannot be directly made.

By contrast, if the background playback is not made, the control unit 30 controls the flow to advance to step 4b, and checks if the housings 1 and 2 of the mobile phone are closed. The open/close state of the housings 1 and 2 is determined based on the detection signal from the open/close detector 8. If the housings 1 and 2 are closed, the flow advances to step 4f to recognize that the mobile phone is now in a state wherein the dial keys and function keys on the front surface of the lower housing 2 cannot be operated (input constrained state).

On the other hand, if it is determined that the housings 1 and 2 are opened, the control unit 30 then checks in step 4c if a so-called hold state that disables input due to any erroneous contact to the input unit 5 while the mobile phone is put in the bag or pocket is set. As a result of this checking, if the hold state is set, the flow advances to step 4f to recognize that the mobile phone is now in the input constrained state. On the other hand, if the hold state is not set, the flow advances to step 4d to check if the earphone microphone 7 is connected. If the earphone microphone 7 is connected, the flow advances to step 4f to recognize that the mobile phone is now in the input constrained state.

On the other hand, if it is determined in steps 4a to 4d that no background playback is made, the housings 1 and 2 are opened, the hold state is not set, and the earphone microphone 7 is not connected, the control unit 30 controls the flow to advance to step 4e to recognize that the mobile phone is not in the input constrained state now.

Upon completion of the terminal state determination processing as described above, the control unit 30 checks in step 3f based on the recognition result if the mobile phone is in the input constrained state. As a result of this checking, if the mobile phone is not in the input constrained state, the control unit 30 displays the playback confirmation message about that music content on the main display 4 in step 3g. For example, if the content is copyrighted, the right type is "interval", and the content is to be played back for the first time, a "consumption start selection message" is popup-displayed, as shown in FIG. 5. On the other hand, if the right type is "count" and the remaining playback count is 1, a "one-time left playback selection message" is popup-displayed.

If the user selects and inputs a playback confirmation "yes" by operating the input device 5 in this state, the control unit 30 controls the flow to advance to step 3i to play back the music content. On the other hand, if the user selects and inputs a playback confirmation "no", the control unit 30 controls the flow to advance to step 3j without playing back the music content.

On the other hand, assume that it is determined in step 3f that the mobile phone is now in the input constrained state. Then, the control unit 30 checks in step 3j if all music contents stored in the content storage area of the storage unit 28 have already been selected. If the next music content remains in the content playback list, the flow returns to step 3b to select the next music content from the content playback list and to perform its playback operation.

That is, if it is determined based on the determination result of the playback mode of the music content that the user's playback confirmation operation is required, and if it is determined that the mobile phone is in the input constrained state, that music content is skipped, and the next music content in the content playback list is selected. Then, the content playback processing in steps 3b to 3j is executed for the selected second music content as in the first music content.

Likewise, the content storage area of the storage unit 28 is searched for music contents in turn based on the content playback list, and the content selection/playback processing in steps 3c to 3j is executed for the found music contents. Upon completion of selection of all music contents registered in the content playback list, the flow advances from step 3j to step 3k. In step 3k, a list of skipped music contents of all the music contents registered in the content playback list is displayed. As the display method, a method of displaying an icon or symbol that indicates "not played back" beside the skipped contents upon generating list display data of all contents stored in the storage unit 28, a method of generating list display data of only skipped contents, and the like may be used.

Figure 10:
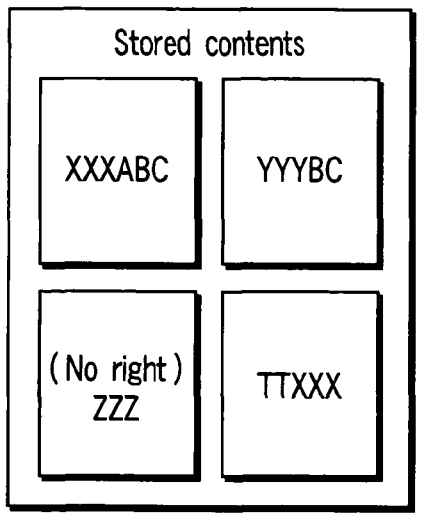
FIG. 10 shows an example of contents stored in a storage unit.

A practical example of the content selection/playback processing will be described below. Assume that the housings 1 and 2 are closed, and the mode for displaying the playback confirmation message is set. Also, assume that the storage unit 28 stores four contents, as shown in FIG. 10. Note that a content "ZZZ" of the four contents has no playback right.

Upon starting the content selection/playback control, a first music content "1. XXXABC" is selected based on the content playback list. An appropriate playback mode of the selected content is determined based on the attribute information of the content and the playback mode determination table in step 3c, and whether or not the mobile phone is in the input constrained state is determined in steps 3e and 3f. As a result of these determination processes, if the playback mode of the first music content is the second playback mode that does not require any user's playback confirmation operation, the first music content is read out from the storage unit 28 and is played back.

Upon completion of playback of the first music content, a second music content "2. YYYBC" is then selected from the content playback list. The playback mode, and whether or not the mobile phone is in the input constrained state are determined for the second music content "2. YYYBC" as in the first music content. As a result, if the playback mode of the second music content is the second playback mode, the second music content is read out from the storage unit 28 and is played back.

Upon completion of playback of the second music content, a second music content "3. ZZZ" is selected. However, the third music content "3. ZZZ" is a "no playback right" content, as shown in FIG. 10. For this reason, it is determined that the playback mode of the content is the first playback mode that requires a user's playback confirmation operation. At this time, since the playback confirmation message display mode is set, and the housings 1 and 2 are closed, the third music content "3. ZZZ" is skipped without being played back.

After the third music content is skipped, a fourth music content "4. SABCD" is selected. However, the storage unit 28 does not store the fourth music content "4. SABCD". For this reason, the fourth music content "4. SABCD" is also skipped.

Finally, a fifth music content "5. TTXXX" is selected. If the playback mode of the content is the second playback mode, the fifth music content is read out from the storage unit 28 and is played back.

Figure 11:
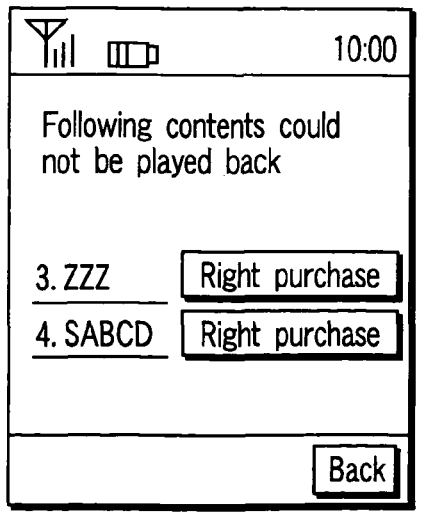
FIG. 11 shows a display example of a list of contents which are not played back.

Upon completion of selection of all the music contents registered in the content playback list, a list of the music contents "3. ZZZ" and "4. SABCD" which are skipped and are not played back by the content selection/playback control is generated, and is displayed on the main display 4. In this case, "right purchase" buttons are displayed on the list in correspondence with these contents. FIG. 11 shows a display example of the list of the contents which are not played back.

If the user selects the "right purchase" button, the mobile phone accesses a corresponding Web site. In this way, the user can re-purchase the right of that content, can re-download a damaged file, and can purchase a content which is included in the list but is not stored in the storage unit 28.

As described above, according to the first embodiment, music contents stored in the content storage area of the storage unit 28 are selected in turn based on the content playback list, and whether or not the user's playback confirmation operation is required and whether or not the mobile phone is in the input constrained state at that time are determined for each selected music content. If it is determined that the music content requires the user's playback confirmation operation, and the mobile phone is in the input constrained state, that music content is skipped, and the next music content of the content playback list is selected; otherwise, that music content is played back.

Therefore, only music contents that do not require any user's playback confirmation operation are automatically selected and are continuously played back. For this reason, the user need not perform any playback confirmation operation in an inconvenient state in which the input operation is constrained. Hence, the user can listen to music contents without any troublesome operations.

Upon completion of selection of all music contents registered in the content playback list, a list of skipped music contents of all the stored music contents is displayed. For this reason, the user can recognize music contents which are skipped and are not played back after completion of playback of music contents. As a result, for example, the user sets the mobile phone in an input unconstrained state, and can play back skipped music contents.

Second Embodiment

According to the second embodiment of the present invention, if it is determined that the mobile phone is in the input constrained state, and if it is determined that the selected content requires a user's playback confirmation operation, the playback confirmation message of the content is displayed before the content is skipped. When the user does not make any playback confirmation operation within a predetermined period of time after the display timing of the playback confirmation message, the content is skipped.

Figure 6:
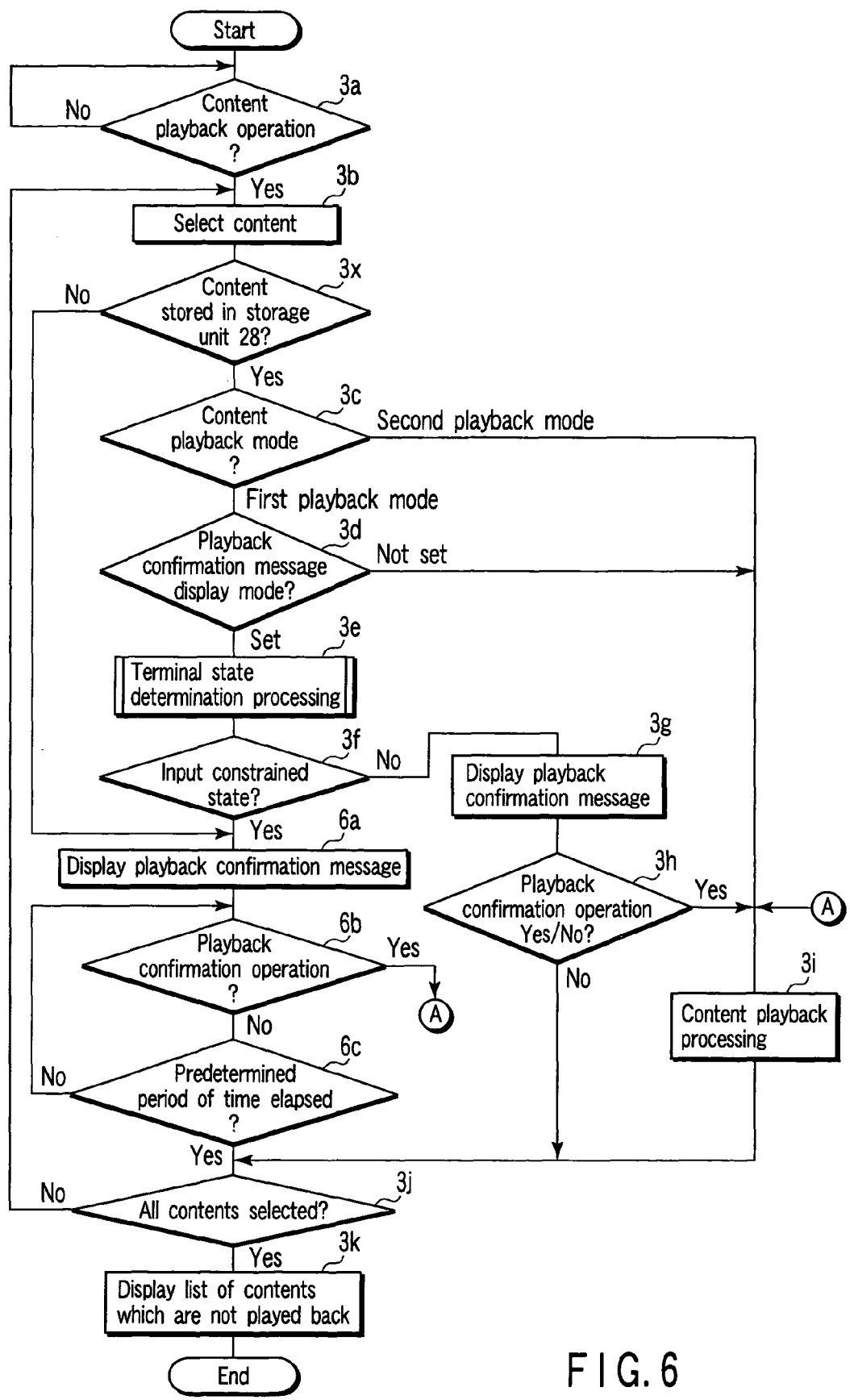
FIG. 6 is a flowchart showing the content playback control sequence and its contents of a mobile phone according to the second embodiment of the present invention.

FIG. 6 is a flowchart showing the content selection/playback control sequence and control contents of a mobile phone according to the second embodiment of the present invention. Note that the same step numbers in FIG. 6 denote the same steps as in FIG. 3, and a detailed description thereof will be omitted. As for the outer appearance and circuit arrangement of the mobile phone, a description will be given while quoting FIGS. 1 and 2 above.

If it is determined in step 3f that the mobile phone is in the input constrained state, the control unit 30 displays the playback confirmation message of that content on the main display 4 in step 6a. The control unit 30 monitors the presence/absence of the user's playback confirmation operation in step 6b while monitoring an elapse of time in step 6c. In this state, if a predetermined period of time has elapsed from the display start timing of the playback confirmation message, the control unit 30 controls the flow to advance from step 6c to step 3j. If contents to be selected remain in the content playback list, the flow returns to step 3b to-select the next content. That is, the control unit 30 skips playback of the music content.

By contrast, if the user performs the playback confirmation operation within a predetermined period of time after the display start timing of the playback confirmation message, and the operation contents are "yes", the control unit 30 controls the flow to advance to step 3i to execute playback processing of the music content. On the other hand, if the operation contents are "no", the control unit 30 continues to monitor the playback confirmation operation in steps 6b and 6c.

As described above, according to the second embodiment, if it is determined that the music content selected from the content playback list requires the user's playback confirmation operation, and if it is determined that the mobile phone is in the input constrained state, the playback confirmation message is displayed before the music content is skipped. If the user inputs a playback confirmation "yes" within a predetermined period of time after the display start timing of this playback confirmation message, the music content can be played back without being skipped. Therefore, the content that requires the playback confirmation operation can be played back in compliance with the user's wishes without being unconditionally skipped.

Third Embodiment

In the third embodiment of the present invention, upon playing back contents, whether or not the mobile phone is in a state that constrains the user's input operation is determined first. If it is determined that the mobile phone is in the input constrained state, contents which do not require any user's playback confirmation operation are simultaneously selected from those stored in the storage unit 28, and the simultaneously selected contents are played back in turn.

Figure 7:
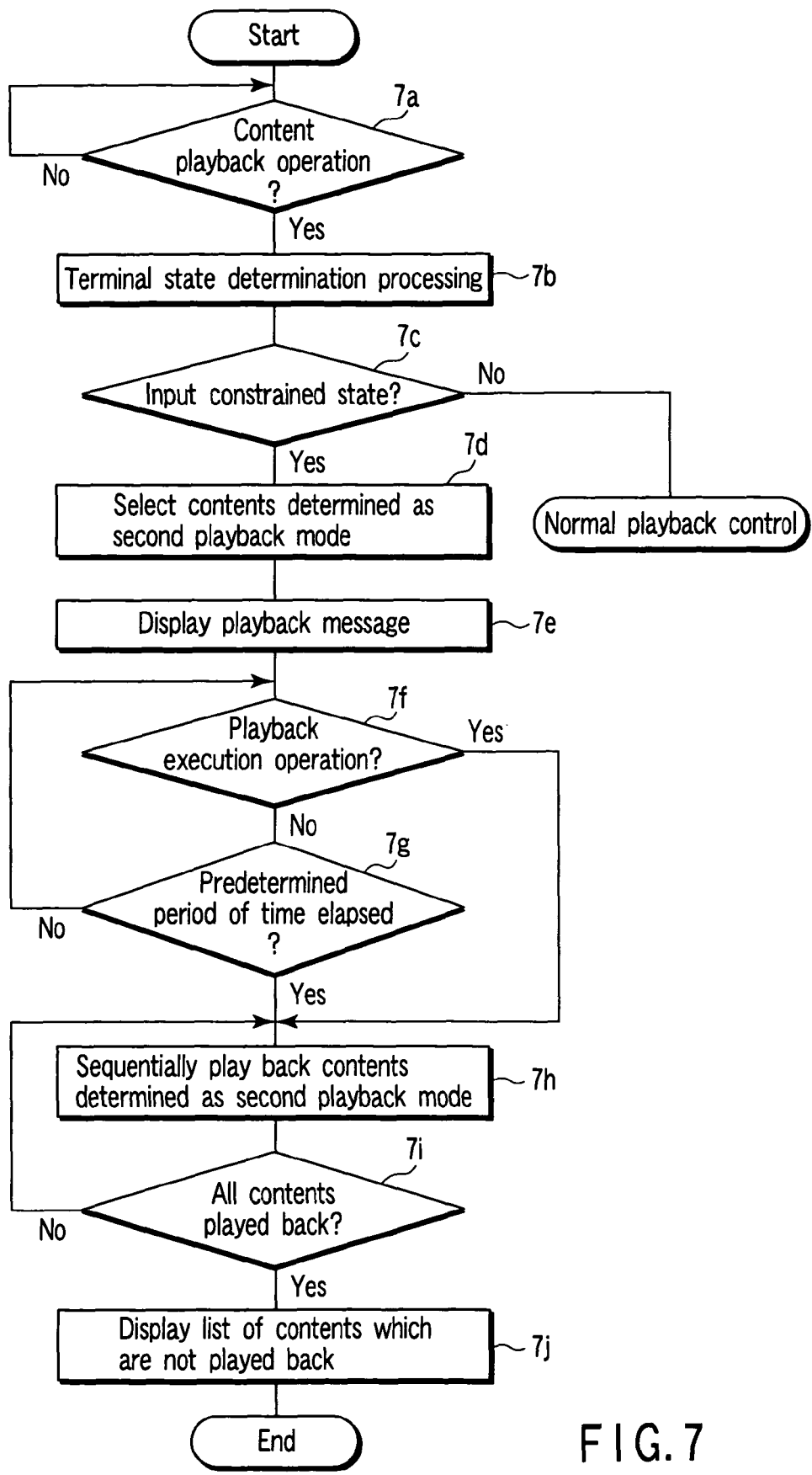
FIG. 7 is a flowchart showing the content playback control sequence and its contents of a mobile phone according to the third embodiment of the present invention.

FIG. 7 is a flowchart showing the content selection/playback control sequence and control contents of a mobile phone according to the third embodiment of the present invention. As for the outer appearance and circuit arrangement of the mobile phone, a description will be given while quoting FIGS. 1 and 2 above.

Assume that the user performs a content playback operation to play back music contents while a plurality of music contents are stored in the storage unit 28. Upon detection of this operation in step 7a, the control unit 30 controls the flow to advance to step 7b, and checks the state of the mobile phone. The terminal state determination processing is done by checking execution of background playback, the open/close state of the housings 1 and 2, the presence/absence of the setting of the hold state, and the presence/absence of the connection of the earphone microphone 7, as shown in FIG. 4.

Upon completion of the terminal state determination processing, the control unit 30 checks in step 7c if the mobile phone is in the input constrained state. As a result of this checking, if the mobile phone is not in the input constrained state, the control unit 30 executes a normal playback control sequence. This normal playback control sequence is executed as follows. That is, the control unit 30 selects music contents from the content playback list one by one, and displays a playback confirmation message if each selected music content requires a playback confirmation operation. If the user inputs "yes" for this message, the control unit 30 plays back that music content. By contrast, if the selected music content does not require any playback confirmation operation, the control unit 30 plays back the content intact.

On the other hand, assume that it is determined in step 7c that the mobile phone is in the input constrained state. Then, the control unit 30 selects all contents to which the second playback mode that does not require any user's playback confirmation operation is applied from a plurality of music contents registered in the content playback list in the storage unit 28. Prior to playback of the contents, the control unit 30 displays a message indicating that only contents to which the second playback mode is applied are played back on the main display 4. In this case, a message indicating that contents to which the first playback mode that requires the user's playback confirmation operation is applied, and contents which are not stored in the storage unit 28 are not played back may be displayed on the main display 4.

The control unit 30 then monitors the presence/absence of a user's playback execution operation in step 7f while monitoring an elapse of time in step 7g. In this state, if the user performs the playback execution operation after he or she confirmed the message, the control unit 30 controls the flow to advance from step 7f to step 7h, and sequentially plays back the selected contents to which the second playback mode is applied. Even when the user does not perform any playback execution operation, if a predetermined period of time has elapsed from the display start timing of the message, the control unit 30 controls the flow to advance to step 7h, and sequentially plays back the selected contents to which the second playback mode is applied.

Upon completion of the playback processing of all the contents which are selected in step 7d and to which the second playback mode is applied, the control unit 30 controls the flow to advance from step 7i to step 7j, and displays a list of contents which are not played back and to which the first playback mode is applied of all music contents registered in the content playback list, and contents which are included in the content playback list but are not stored in the storage unit 28.

As described above, according to the third embodiment, whether or not the mobile phone is in a state that constrains the user's input operation is checked first. If it is determined that the mobile phone is in the input constrained state, contents to which the second playback mode that does not require any user's playback confirmation operation is applied are simultaneously selected from a plurality of music contents registered in the content playback list in the storage unit 28, and the simultaneously selected music contents are played back in turn.

Therefore, in the user's input operation constrained state, the user can continuously play back music contents without any troublesome playback confirmation operation for each music piece. Also, whether or not each content requires a user's prior playback confirmation operation and whether or not the mobile phone is in the input constrained state need not be determined for respective contents. For this reason, contents can be smoothly and continuously played back without any unnatural intervals between neighboring music pieces.

Prior to playback of the selected contents, a message indicating that only contents to which the second playback mode that does not require any user's playback confirmation operation is applied are to be played back, or a message indicating that contents to which the first playback mode that requires a user's playback confirmation operation and music contents which are registered in the playback list but are not stored in the storage unit 28 are not played back is displayed on the main display 4. For this reason, the user can recognize that only some contents are to be played back before playback.

Other Embodiments

In the third embodiment, when contents to which the second playback mode is applied are simultaneously selected from the storage unit 28, if no contents to which the second playback mode is applied are found, a message that advises accordingly may be displayed on the main display 4. In this way, the user can recognize the reason why no contents are played back.

Upon completion of the playback processing of the contents to which the second playback mode is applied, a list of contents which are not played back and to which the first playback mode is applied, and music contents which are included in the content playback list but are not stored in the storage unit 28 may be stored, and only these contents may be selectively played back in response to a user's content playback request later.

Furthermore, in the third embodiment, contents to which the second playback mode is applied are simultaneously selected, and the selected contents are played back in turn.

However, the present invention is not limited to such specific processing. For example, when it is determined that the mobile phone is in the input constrained state, first contents that require a prior playback confirmation operation of those which are stored in the storage unit are excluded from contents to be played back. Then, second contents other than the first contents excluded from the contents to be played back of those which are stored in the storage unit may be played back in turn.

Moreover, in the above embodiments, the mobile phone has been exemplified. However, the present invention is not limited to such specific terminal, and the present invention can be applied to various other portable terminals such as PDAs (Personal Digital Assistants), notebook type personal computers, game machines, portable audio players, cameras, and the like. Furthermore, the present invention can also be applied to desktop personal computers, stereo apparatuses, television receivers, and the like.

In addition, the types and arrangements of information terminals, the types and detection methods of the input constrained state, the types and playback methods of contents, the content selection/playback control sequence and control contents, and the like can be variously modified without departing from the scope of the present invention.

In brief, the present invention is not limited to the embodiments intact, and can be embodied by modifying required constituent elements without departing from the scope of the invention when it is practiced. Also, various inventions can be formed by appropriately combining a plurality of required constituent elements disclosed in the respective embodiments. For example, some required constituent elements may be omitted from all required constituent elements disclosed in the respective embodiments. Furthermore, required constituent elements across different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable information terminal for playing content comprising:
   a storage unit configured to store a plurality of contents;
   a selection unit configured to sequentially select respective ones of the plurality of contents to be played back from the plurality of contents stored in the storage unit;
   a first determination unit configured to, every time when a content is selected, determine for the content selected by the selection unit whether a first playback mode that requires a prior playback confirmation operation or a second playback mode that does not require any prior playback confirmation operation is suitable as a playback mode of that content;
   a second determination unit configured to determine whether or not the information terminal is in an input constrained state in which a user's input operation is constrained;
   a first control unit configured to skip the content without playing back the content if it is determined that the first playback mode is suitable as the playback mode of the selected content and the portable information terminal is in an input constrained state; and
   a second control unit configured to play back the content if it is determined that the second playback mode is suitable as the playback mode of the selected content.

2. The terminal according to claim 1, wherein the first determination unit determines the presence/absence of a playback constraint based on a copyright, and the presence/absence of file damage to the content selected by the selection unit, decides for the content which is determined to have the playback constraint or file damage that the first playback mode is suitable, and decides for the content which is determined to have neither the playback constraint nor file damage that the second playback mode is suitable.

3. The terminal according to claim 1, wherein the first control unit comprises:
   a unit configured to present a message that prompts the user to perform a playback confirmation operation of the content to the user when it is determined that the information terminal is in the input constrained state and it is determined that the first playback mode is suitable as the playback mode of the content selected by the selection unit;
   a unit configured to monitor the playback confirmation operation; and
   a unit configured to skip the content without playing back the content when the playback confirmation operation is not detected within a predetermined period of time after a presentation start timing of the message.

4. The terminal according to claim 1, further comprising a unit configured to present content which are skipped by the first control unit to the user after the selection unit has selected all predetermined content.

5. The terminal according to claim 4, further comprising:
   a unit configured to accept the user's playback request of first content which are skipped by the first control unit; and
   a unit configured to play back a content included in a list of the first content upon acceptance of the user's playback request.

6. The portable information terminal according to claim 1, wherein the second determination unit is configured to determine whether or not a background playback mode is set as a content playback mode, and when it is determined that a background playback mode is set, the second determination unit determines the portable information terminal is in the input constrained state.

7. The portable information terminal according to claim 1, wherein the second determination unit is configured to determine whether or not a housing of the portable information terminal is closed, and when it is determined that the housing is closed, the second determination unit determines the portable information terminal is in the input constrained state.

8. The portable information terminal according to claim 1, wherein the second determination unit is configured to determine whether or not a hold state is set to disable input operation by an input device of the portable information terminal, and when it is determined that the hold state is set, the second determination unit determines the portable information terminal is in the input constrained state.

9. The portable information terminal according to claim 1, wherein the second determination unit is configured to determine whether or not an earphone microphone is connected to the portable information terminal, and when it is determined that the earphone microphone is connected, the second determination unit determines the portable information terminal is in the input constrained state.

10. A portable information terminal with a function of playing back content, comprising:

a storage unit configured to store a first content that requires a prior playback confirmation operation and a second content that does not require a prior playback confirmation operation;

a determination unit configured to determine whether or not the portable information terminal is in an input constrained state in which a user's input operation is constrained;

a selection unit configured to simultaneously select second content which do not require any prior playback confirmation operation from the content stored in the storage unit when it is determined that the portable information terminal is in the input constrained state; and a playback unit configured to sequentially play back the second content simultaneously selected by the selection unit.

11. The terminal according to claim 10, further comprising:

a unit configured to determine whether or not the second content are selected by the selection unit, and to generate and present, when the second contents are not selected, a message advises the user accordingly.

12. The terminal according to claim 10, further comprising:

a unit configured to generate and present, to the user, a list of first content which are not selected by the selection unit of the content stored in the storage unit upon completion of playback of the selected second content.

13. The terminal according to claim 12, further comprising:

a unit configured to accept the user's playback request of the presented first content; and a unit configured to play back a content included in the list of the first content upon acceptance of the user's playback request.

14. A portable information terminal with a function of playing back content, comprising:

a storage unit configured to store a first content that requires a prior playback confirmation operation and a second content that does not require a prior playback confirmation operation;

a determination unit configured to determine whether or not the portable information terminal is in an input constrained state in which a user's input operation is constrained;

an exclusion unit configured to exclude the first content that requires a prior playback confirmation operation from contents to be played back of the content stored in the storage unit when it is determined that the portable information terminal is in the input constrained state; and a unit configured to sequentially play back the second content other than the first contents excluded from the content to be played back by the exclusion unit of the content stored in the storage unit.

15. The terminal according to claim 14, further comprising:

a unit configured to determine, as a result of exclusion of the first content by the exclusion unit, whether or not second content remain stored in the storage unit, and to generate and present, when no second content remains, a message that advises the user accordingly.

16. The terminal according to claim 14, further comprising:

a unit configured to generate and present, to the user, a list of the first content excluded by the exclusion unit of the content stored in the storage unit upon completion of playback of the selected second contents.

17. The terminal according to claim 16, further comprising:

a unit configured to accept the user's playback request of the presented first content; and a unit configured to play back a content included in the list of the first content upon acceptance of the user's playback request.

* * * * *